(12) United States Patent
Ferris

(10) Patent No.: US 8,984,505 B2
(45) Date of Patent: Mar. 17, 2015

(54) PROVIDING ACCESS CONTROL TO USER-CONTROLLED RESOURCES IN A CLOUD COMPUTING ENVIRONMENT

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 1336 days.

(21) Appl. No.: 12/324,621

(22) Filed: Nov. 26, 2008

(65) Prior Publication Data

US 2010/0131949 A1 May 27, 2010

(51) Int. Cl.
G06F 9/46 (2006.01)
G06F 9/50 (2006.01)

(52) U.S. Cl.
CPC .............. *G06F 9/5027* (2013.01); *Y02B 60/142* (2013.01); *G06F 2209/504* (2013.01)
USPC .............................................. 718/1; 718/104

(58) Field of Classification Search
CPC ................ G06F 9/5061; G06F 9/5027; G06F 2209/504; Y02B 60/142
USPC ............................................ 718/104, 102, 1
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,437,440 B2 * | 10/2008 | Manion et al. ................ | 709/223 |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,574,496 B2 * | 8/2009 | McCrory et al. ............... | 709/223 |
| 7,596,620 B1 | 9/2009 | Colton et al. | |
| 7,912,822 B2 * | 3/2011 | Bethlehem et al. ........... | 707/705 |
| 8,014,308 B2 * | 9/2011 | Gates et al. .................... | 370/252 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 * | 6/2005 | Fatula, Jr. ........................ | 707/8 |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |
| 2006/0085824 A1 | 4/2006 | Bruck et al. | |

(Continued)

OTHER PUBLICATIONS

Ferris, et al., "Systems and Methods for Cominatorial Optimization of Multiple Resources Across a Set of Cloud-Based Networks", U.S. Appl. No. 12/953,718, filed Nov. 24, 2010.

(Continued)

*Primary Examiner* — Camquy Truong
(74) *Attorney, Agent, or Firm* — Lowenstein Sandler LLP

(57) ABSTRACT

A cloud computing environment can be configured to allow third party, user-controlled resources to be included in the pool of resources available in the cloud. The user-controlled resources can include a cloud application to communicate with a cloud management system to coordinate access to the user-controlled resources. The cloud application allows the user to specify the specific set of resources that the cloud can access, such as specific hardware and software resources.

22 Claims, 5 Drawing Sheets

(56) References Cited

U.S. PATENT DOCUMENTS

| | | | |
|---|---|---|---|
| 2006/0130144 | A1 | 6/2006 | Wernicke |
| 2006/0177058 | A1 | 8/2006 | Sarwono et al. |
| 2006/0224436 | A1 | 10/2006 | Matsumoto et al. |
| 2007/0011291 | A1 | 1/2007 | Mi et al. |
| 2007/0028001 | A1 | 2/2007 | Phillips et al. |
| 2007/0226715 | A1 | 9/2007 | Kimura et al. |
| 2007/0283282 | A1 | 12/2007 | Bonfiglio et al. |
| 2007/0294676 | A1 | 12/2007 | Mellor et al. |
| 2008/0080396 | A1 | 4/2008 | Meijer et al. |
| 2008/0080718 | A1 | 4/2008 | Meijer et al. |
| 2008/0082538 | A1 | 4/2008 | Meijer et al. |
| 2008/0082601 | A1 | 4/2008 | Meijer et al. |
| 2008/0083025 | A1 | 4/2008 | Meijer et al. |
| 2008/0083040 | A1 | 4/2008 | Dani et al. |
| 2008/0086727 | A1 | 4/2008 | Lam et al. |
| 2008/0091613 | A1 | 4/2008 | Gates et al. |
| 2008/0104608 | A1 | 5/2008 | Hyser et al. |
| 2008/0215796 | A1 | 9/2008 | Lam et al. |
| 2008/0240150 | A1 | 10/2008 | Dias et al. |
| 2009/0012885 | A1 | 1/2009 | Cahn |
| 2009/0025006 | A1 | 1/2009 | Waldspurger |
| 2009/0037496 | A1 | 2/2009 | Chong et al. |
| 2009/0089078 | A1 | 4/2009 | Bursey |
| 2009/0099940 | A1 | 4/2009 | Frederick et al. |
| 2009/0132695 | A1 | 5/2009 | Surtani et al. |
| 2009/0177514 | A1 | 7/2009 | Hudis et al. |
| 2009/0210527 | A1 | 8/2009 | Kawato |
| 2009/0210875 | A1 | 8/2009 | Bolles et al. |
| 2009/0217267 | A1 | 8/2009 | Gebhart et al. |
| 2009/0222805 | A1 | 9/2009 | Faus et al. |
| 2009/0228950 | A1* | 9/2009 | Reed et al. .................. 726/1 |
| 2009/0248693 | A1 | 10/2009 | Sagar et al. |
| 2009/0249287 | A1 | 10/2009 | Patrick |
| 2009/0260007 | A1 | 10/2009 | Beaty et al. |
| 2009/0265707 | A1 | 10/2009 | Goodman et al. |
| 2009/0271324 | A1 | 10/2009 | Jandhyala et al. |
| 2009/0276771 | A1 | 11/2009 | Nickolov et al. |
| 2009/0287691 | A1 | 11/2009 | Sundaresan et al. |
| 2009/0293056 | A1 | 11/2009 | Ferris |
| 2009/0299905 | A1 | 12/2009 | Mestha et al. |
| 2009/0299920 | A1 | 12/2009 | Ferris et al. |
| 2009/0300057 | A1 | 12/2009 | Friedman |
| 2009/0300149 | A1 | 12/2009 | Ferris et al. |
| 2009/0300151 | A1 | 12/2009 | Friedman et al. |
| 2009/0300152 | A1 | 12/2009 | Ferris |
| 2009/0300169 | A1 | 12/2009 | Sagar et al. |
| 2009/0300210 | A1 | 12/2009 | Ferris |
| 2009/0300423 | A1 | 12/2009 | Ferris |
| 2009/0300607 | A1 | 12/2009 | Ferris et al. |
| 2009/0300608 | A1 | 12/2009 | Ferris |
| 2009/0300635 | A1 | 12/2009 | Ferris |
| 2009/0300641 | A1 | 12/2009 | Friedman et al. |
| 2009/0300719 | A1 | 12/2009 | Ferris |
| 2010/0042720 | A1 | 2/2010 | Stienhans et al. |
| 2010/0050172 | A1 | 2/2010 | Ferris |
| 2010/0057831 | A1 | 3/2010 | Williamson |
| 2010/0058347 | A1 | 3/2010 | Smith et al. |
| 2010/0131324 | A1 | 5/2010 | Ferris |
| 2010/0131590 | A1 | 5/2010 | Coleman et al. |
| 2010/0131624 | A1 | 5/2010 | Ferris |
| 2010/0131649 | A1 | 5/2010 | Ferris |
| 2010/0131948 | A1 | 5/2010 | Ferris |
| 2010/0132016 | A1 | 5/2010 | Ferris |
| 2010/0169477 | A1 | 7/2010 | Stienhans et al. |
| 2010/0220622 | A1 | 9/2010 | Wei |
| 2010/0299366 | A1 | 11/2010 | Stienhans et al. |
| 2011/0016214 | A1 | 1/2011 | Jackson |
| 2011/0131335 | A1 | 6/2011 | Spaltro et al. |
| 2012/0124129 | A1* | 5/2012 | Klimentiev et al. .......... 709/203 |
| 2012/0254436 | A1* | 10/2012 | Bihani et al. ................. 709/226 |

OTHER PUBLICATIONS

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris at al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Generating Optimized Resource Consumption Periods for Multiple Users on Combined Basis", U.S. Appl. No. 13/037,359, filed Mar. 1, 2011.

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

"rBuilder and the rPath Appliance Platform", 2007 rPath, Inc., .rpath.com, 6 pages.

White Paper—"rPath Versus Other Software Appliance Approaches", Mar. 2008, rPath, Inc., .rpath.com, 9 pages White Paper—"Best Practices for Building Virtual Appliances", 2008 rPath, Inc., .rpath.com, 6 pages.

Ferris, "Methods and Systems for Providing a Market for User-Controlled Resources to be Provided to a Cloud Computing Environment", U.S. Appl. No. 12/390,617, filed Feb. 23, 2009.

(56) References Cited

OTHER PUBLICATIONS

Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
Ferris, "Methods and Systems for Providing a Universal Marketplace for Resources for Delivery to a Cloud Computing Environment", U.S. Appl. No. 12/475,228, filed May 29, 2009.
DeHaan et al., "Systems and Methods for Power Management in Managed Network Having Hardware-Based and Virtual Reources", U.S. Appl. No. 12/475,448, filed May 29, 2009.
DeHaan et al., "Methods and Systems for Flexible Cloud Management with Power Management Support", U.S. Appl. No. 12/473,987, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 28, 2009.
DeHaan, "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris, "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environment", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
DeHaan, "Methods and Systems for Abstracting Cloud Management", U.S. Appl. No. 12/474,113, filed May 28, 2009.

* cited by examiner

PROVIDING ACCESS CONTROL TO USER-CONTROLLED RESOURCES IN A CLOUD COMPUTING ENVIRONMENT

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

In application specific computing environments, individual users may be able to add their particular computing resources to the perform computing processes. For example, the Search for Extraterrestrial Intelligence (SETI) program allows individual users to contribute the processing power of their personal systems for performing mathematical computations on experimental data. In these application specific computing environments, the user lacks the ability to limit access to their personal system if they participate in the computing environment.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for extending cloud resources to third party resources. More particularly, embodiments relate to platforms and techniques in which a cloud computing environment can be granted access to user-controlled resources, such as computing or storage resources of a networked user system.

According to embodiments, a cloud computing environment can be configured to allow third party, user-controlled resources to be included in the pool of resources available in the cloud. To achieve this, the user-controlled resources can be configured to include a cloud application. The cloud application can be configured to communicate with a cloud management system to coordinate access to the user-controlled resources. The cloud application can be configured to identify and allocate a set of resources to be utilized by the cloud.

According to embodiments, the cloud application can be configured to allow the user to specify the specific set of resources that the cloud can access. For example, the user can specify hardware and software resources, such as a particular memory range, a particular processor, one or more storage devices, and the like. Likewise, the cloud application can be configured to allow the user to specify particular clouds and cloud management systems that can access the user-controller resources and can be configured to allow the user specify particular cloud processes that can be performed on the user-controlled resources.

By allowing the user to designate specific resources for contribution to the cloud, a user can participate in the cloud environment while maintaining access control over their system. As such, the user can enhance the flexibility and power of the cloud environment without surrendering control and security of their individual computing systems.

Figure 1:
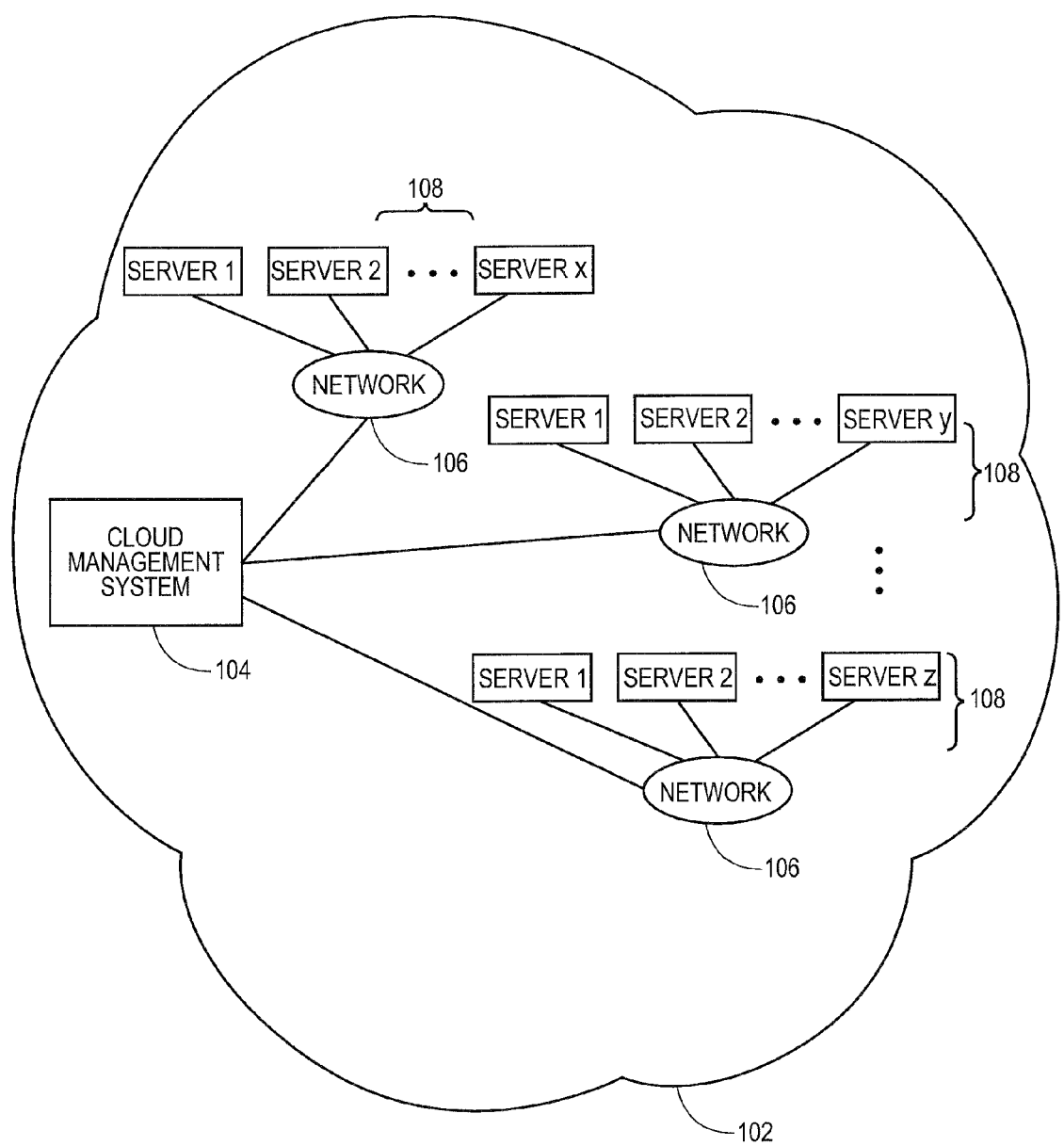
FIG. 1 illustrates an overall cloud system architecture in which various embodiments of the present teachings can be practiced.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
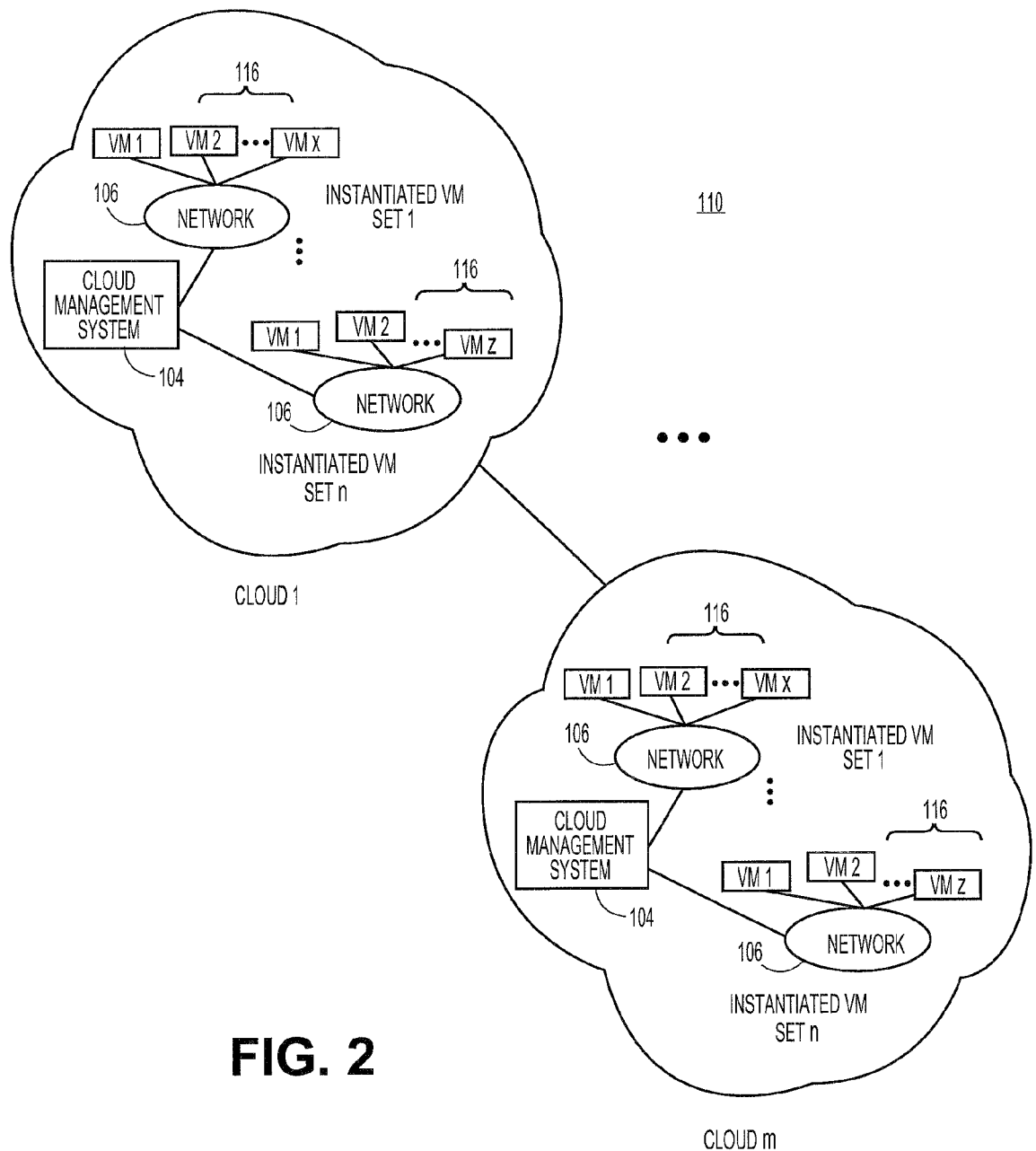
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or farther cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
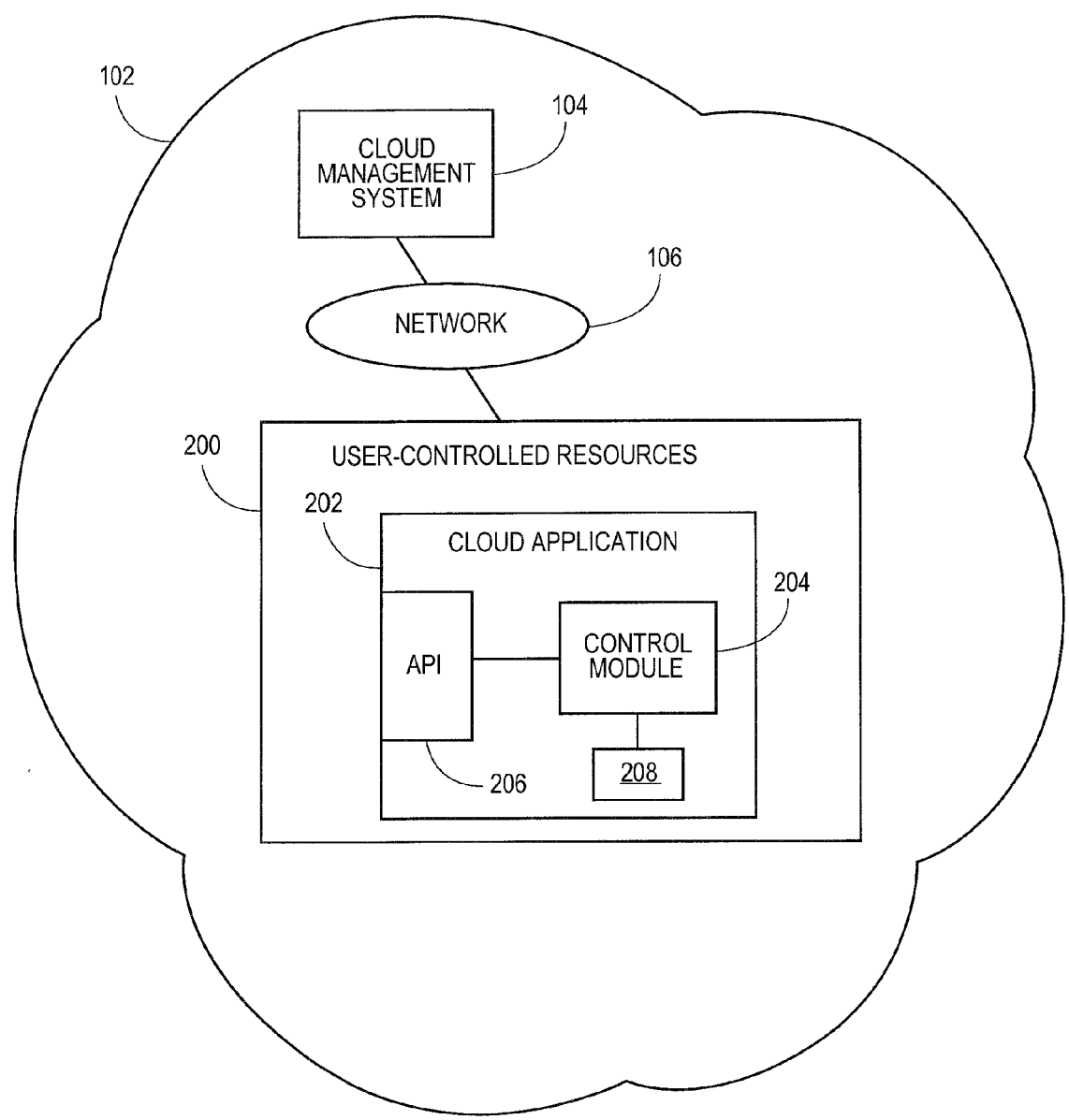
FIG. 3 illustrates an overall cloud system architecture in which user-controlled resources can be utilized as cloud resources, according to various embodiments.

FIG. 3 illustrates aspects of the cloud 102 which can interact with user-controlled resources to deliver cloud based resources, according to various embodiments. In embodiments, the cloud management system 104 can be configured to communicate with one or more user-controlled resources 200 via network 106 to deliver cloud based resources.

In embodiments, the user-controlled resources 200 can be any type of computer system under the control of a user, independent of the owner or operator of the cloud 102. For example, the user-controlled resources 200 can be one or more personal computers (desktop, laptop, etc.), one or more server computers, and the like, which are under the control of individuals, companies, and the like. The user controlled resources 200 can include hardware resources, such as processors, memory, network hardware and bandwidth, storage devices, and the like, and software resources, such as operating systems (OS), application programs, and the like. The user of the user-controlled resources 200 can desire to make the user-controlled resources 200 available to the cloud 102. As such, the cloud management system 104 can utilize the user-controlled resources 200 in the pool of resources of the cloud 102 to host applications, appliances, virtual machines, and the like.

In embodiments as shown, to make the resources available, the user-controlled resources 200 can include a cloud application 202. The cloud application 202 can be configured to allow the user to make a set of the resources of the user-controlled resources 200 available to the cloud 102 and configured to allow the cloud management system 104 to request resources from the set of resources. In response to requests, the cloud application 202 can be configured to provide access to the set of resources for use by the cloud 102. As shown, the cloud application 202 can be configured to include a control module 204, one or more application programming interfaces (APIs) 206, and an access control record 208.

In embodiments, the control module 204 can be configured to contain control logic for identifying and providing accesses to a set of resources of the user-controlled resources 200 and for communicating with the clouds 102 and APIs 206. The control module 204 can be configured to communicate with APIs 206 in order to receive requests from the cloud management system 104 for access to resources.

Likewise, in embodiments, the control module 204 can be configured to communicate with APIs 206 to identify and allocate the set of resources accessible to the cloud 102. APIs 206 can be configured to contain logic for communicating with the hardware resources of the user-controlled resources 200 (e.g. processor, memory, storage devices, network interfaces, etc.) and software resources of the user-controlled resources 200 (operating systems, application programs, etc.). For example, the control module 204 can be configured to communicate with the OS to identify and allocate resources accessible by the cloud 102.

In embodiments, the cloud application 202 can be configured to allow the user to specify a particular set of resources accessible by the cloud 102. For example, the user may desire to allow only certain resources to be accessible by the cloud, such as a particular memory range, a particular processor, one or more storage devices, and the like. Likewise, the cloud application 202 can be configured to allow the user to specify particular clouds and cloud management systems that can access the user controller resources 200 and can be configured to allow the user specify particular cloud processes that can be performed on the user-controlled resources 200.

In embodiments, to specify the set of resources, the control module 204 can be configured to communicate with the user via APIs 206. APIs 206 can be configured to generate GUIs, e.g. dialog boxes or web pages, as required by the cloud application 202 and to provide an interface for the user to select the particular set of resources to make available to the cloud 102 and to select the clouds and processes that can access the set of resources. For example, the cloud application 202 can include, in the interface, the resources that are available, and the cloud application 202 can allow the user to select the set of resources from the available resources. As such, the control module 204 can be configured to access the hardware and software resources of the user-controlled resources 200 to identify the available resources.

In embodiments, once selected by the user, the control module 204 can be configured to store the selected set of resources available to the cloud 102 and the selected clouds and processes that can access the set of resources in the access control record 208. The access control record 208 can be configured as any type of data structure for storing the particular set of resources selected by the user. The control module 204 can be configured to maintain the access record 208 in the cloud application 202 or any any other memory or storage device of the user controlled resources 200.

In embodiments, the cloud application 202 can be configured to control the access to the particular set of resources utilizing any type of access control protocol. For example, the cloud application 200 can be configured with a proprietary protocol that communicates with the hardware and software resources of the user-controlled resources 200 to allow access to the set of resources and limit access to the remaining resources. Likewise, the cloud application 202 can be configured to operate in conjunction with other access control programs, such as Security Enhanced Linux (SELinux) to allow access to the set of resources and limit access to the remaining resources.

In embodiments, once the user has selected the particular set of resources, the cloud management system 104 can request the set of resources for cloud processes. For example, the cloud application 202 can be configured to receive the request for the set of resources via APIs 206. The request can include the amount of resources desired as well as the particular processes to be performed (application, appliance, virtual machine, and the like) by the user-controlled resources 200. The control module 204 can be configured to identify the allowed set of resources for the requested cloud 102 from the access control record 208 and communicate with the allowed set of resources, via APIs 206, to grant access to the cloud 102.

In embodiments, once the set of resources are identified, the cloud application 202 can be configured to grant access to the set of resources. For example, the control module 204 can be configured to communicate with the hardware and software resources to grant direct access to the set of resources to the cloud 102 for instance, via TCP/IP, FTP or other protocols or channels. Likewise, the control module 204 can be configured to receive the processes to be performed on the user-controlled resources 200 and to instantiate the processes on the set of resources.

In embodiments, the cloud application 202 can be configured to provide secure communications between the cloud application 202, the cloud 102, and the user-controlled resources 200. The cloud application 202 can be configured to include the necessary logic to perform any known security protocols between the user-controlled resources 200 and the cloud 102. For example, the cloud application can be configured to perform authentication (secure login, passwords checks, digital signatures authentication, digital certificate authentication, etc), communication encryption (symmetric cryptography, asymmetric cryptography, etc.), and the like.

In embodiments, the cloud application 202 can be configured to allow the user to modify or update the set of resources accessible by the cloud 102, the clouds allowed to access the resources, and/or the processes allowed to access the resources, or to allow the user to end participation in the cloud 102. For example, the cloud application 202 can be configured to receive new selections via generated interfaces at the direction of the user. Likewise, the cloud application 202 can be configured to prompt the user to update or modify the selections at time periods specified by the user or the cloud application 202.

Figure 4:
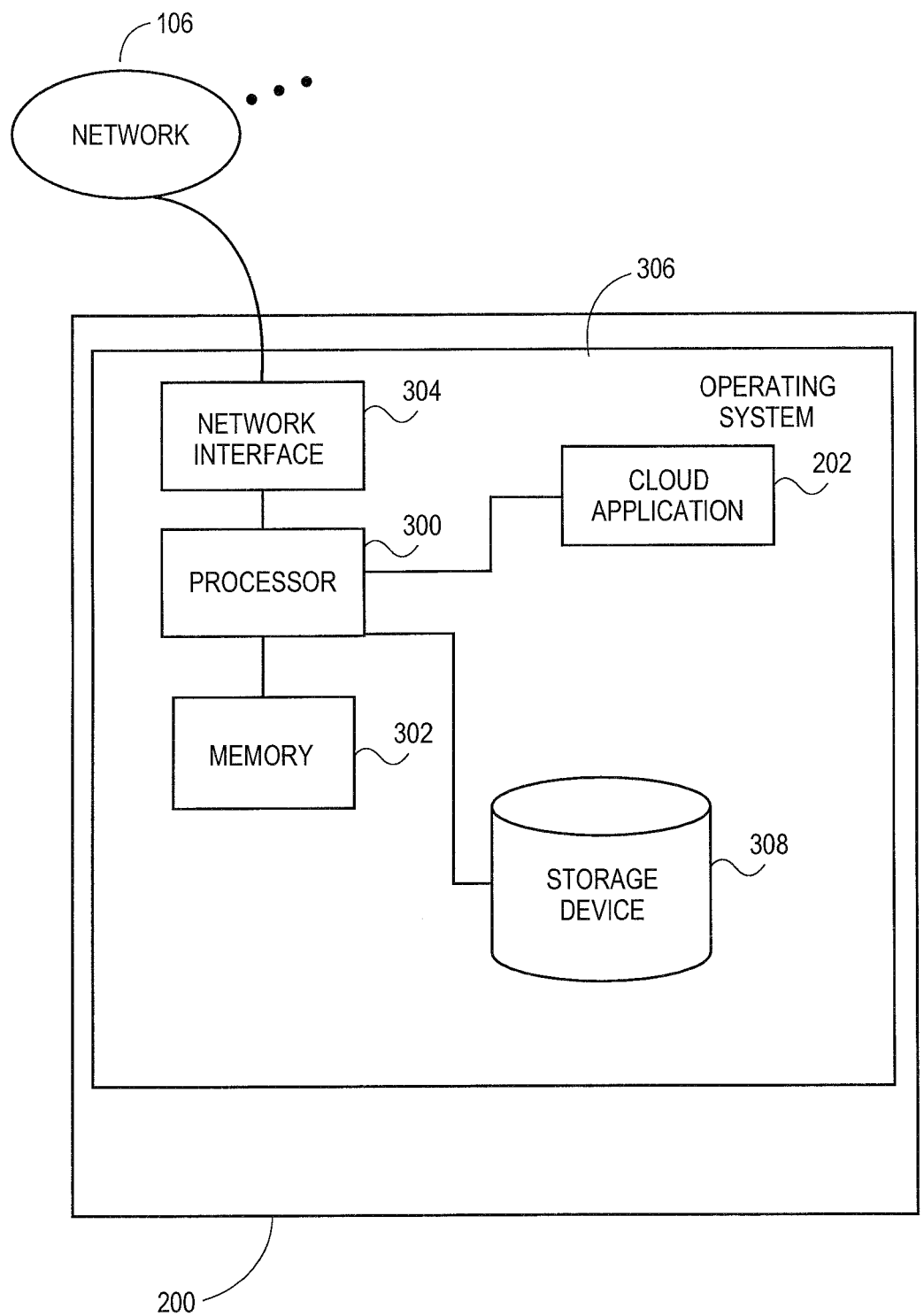
FIG. 4 illustrates an exemplary hardware configuration for user-controlled resources, according to various embodiments.

FIG. 4 illustrates an exemplary diagram of hardware and other resources that can be incorporated in the user-controlled resources 200 and configured to communicate with the cloud 102 and the cloud management system 104 via one or more networks 106, according to embodiments. In embodiments as shown, the user-controlled resources 200 can comprise a processor 300 communicating with memory 302, such as electronic random access memory, operating under control of or in conjunction with operating system 306. Operating system 306 can be, for example, a distribution of the Linux™ operating system, such as SELinux, the Unix™ operating system, or other open-source or proprietary operating system or platform. Processor 300 also communicates with one or more storage device 308, such as hard drives, optical storage, and the like. Processor 300 further communicates with network interface 304, such as an Ethernet or wireless data connection, which in turn communicates with one or more networks 106, such as the Internet or other public or private networks.

Processor 300 also communicates with the cloud application 202, to execute control logic and allow access to the user-controlled resources 200 as described above and below. For example, the cloud application 202 can operate in conjunction with OS 306 to allow a user to select a particular set of resources and to grant the cloud 102 access to the particular set of resources. Other configurations of the user-controlled resources 200, associated network connections, and other hardware and software resources are possible.

While FIG. 4 illustrates the user-controlled resources 200 as a standalone system including a combination of hardware and software, the user-controlled resources 200 can include multiple system operating in cooperation. The cloud application 202 can be implemented as a software application or program capable of being executed by the user-controlled resources 200, as illustrated, or other conventional computer platforms. Likewise, the cloud application 202 can also be implemented as a software module or program module capable of being incorporated in other software applications and programs. In either case, the cloud application 202 can be implemented in any type of conventional proprietary or open-source computer language.

Additionally, as illustrated in FIGS. 3 and 4, the cloud application 202 can communicate with one cloud 102 to provide user-controlled resources to the cloud 102. Likewise, the cloud application 202 can be configured to communicate with multiple clouds to provide the particular set of resources to the multiple clouds or to provide a particular set of resources to each of the multiple clouds.

Figure 5:
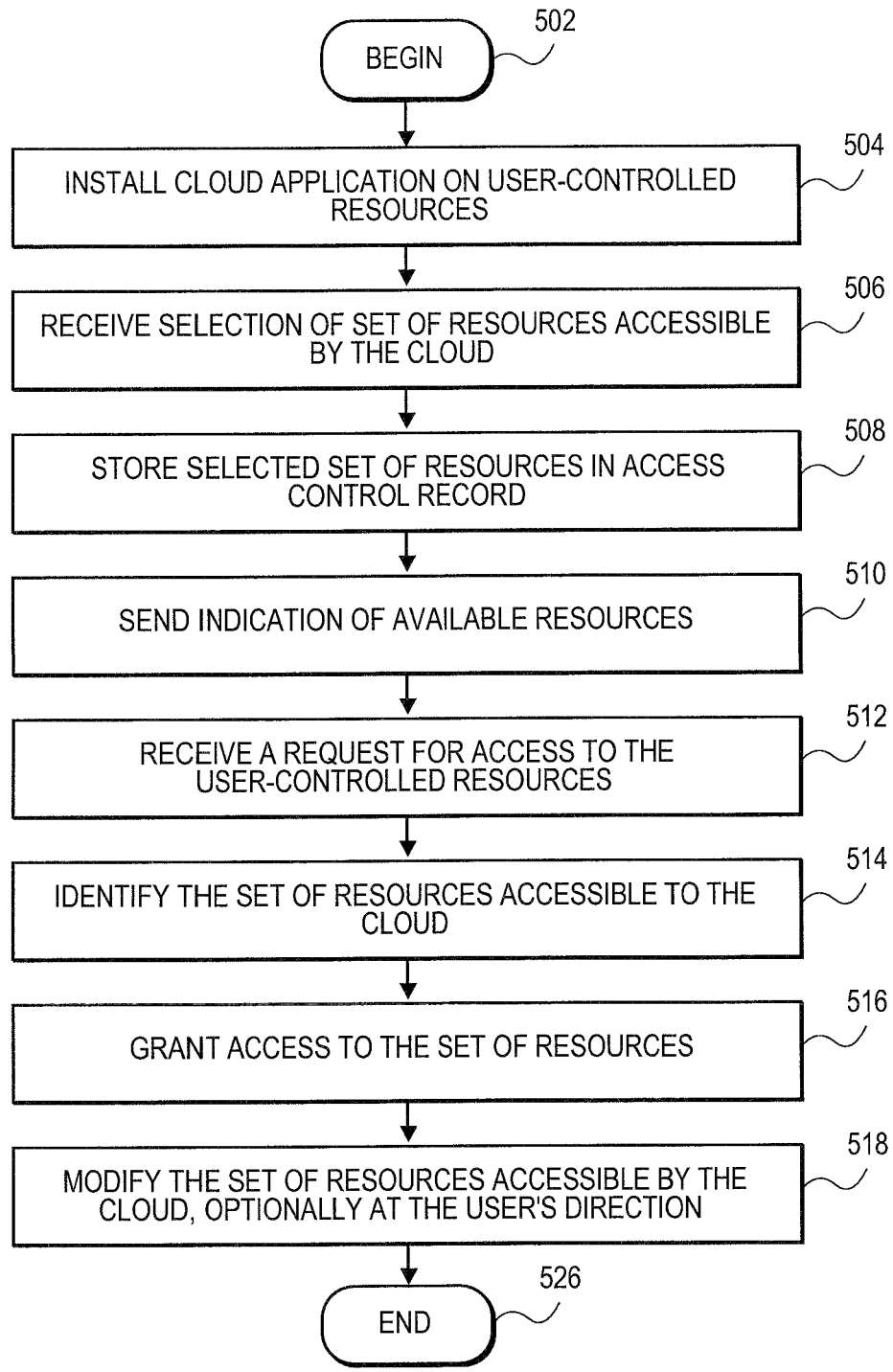
FIG. 5 illustrates a flowchart for access to user-controlled resources, according to various embodiments.

FIG. 5 illustrates a flow diagram of access control of user-controlled resources in a cloud computing environment, according to embodiments. In 502, processing can begin. In 504, the user of user-controlled resources 200 can decide to participate in the cloud 102. As such, the cloud application 202 can be installed on the user-controlled resources 200. For example, the user-controlled resources 200 can obtain the cloud application 202 from the cloud management system 104 via network 106. Likewise, the user-controlled resources 200 can obtain the cloud application via other media, such as flash drive, optical disk, and the like.

In 506, the user can select a particular set of resources of the user-controlled resources 200 to make available to the cloud 102. The cloud application 202 can generate GUIs, e.g. dialog boxes, web pages, as required by the cloud application 202, to provide an interface for the user to select the particular set of resources to make available to the cloud 102. For example, the cloud application 202 can include, in the interface, the resources that are available, and the cloud application 202 can allow the user to select the set of resources from the available resources. The cloud application 202 can receive the selection once made. In 508, the cloud application 202 can store the selected set of resources in the access control record 208.

In 510, the cloud application 202 can send an indication of the selected resources to the cloud 102. The indication can be an amount of resources available to the cloud such as available memory, processing cycles, bandwidth, storage, and the like. The cloud application 202 can determine the amount of resources from the selected set of resources. The cloud application 202 can send the indication via network 106.

In 512, the cloud application 202 can receive a request for access to the set of resources. The cloud application 202 can receive the request via network 106. The request can include the amount of resources desired as well as the particular process to be performed (application, appliance, virtual machine, and the like) by the user-controlled resources 200.

In 514, the cloud application 202 can identify the set of resources that are available to the cloud 102. The cloud application 202 can access the access control record 208 in order to identify the set of resources available. For example, the cloud application 202 can identify the particular set of hardware and software resources allowed. Likewise, the cloud application 202 can identify if the cloud 102 or/and the cloud processes can access the set of resources.

In 516, the cloud application 202 can grant access to the set of resources to the cloud 102. For example, the cloud application 202 can be configured to communicate with the hardware and software resources to grant direct access to the set of resources to the cloud 102, for instance, via TCP/IP, FTP or other protocols or channels. Likewise, the cloud application 202 can be configured to receive the processes to be performed on the user-controlled resources 200 and to instantiate the processes on the set of resources.

In 518, the cloud application 202 can allow the user to change the set of resources accessible by the cloud 102, the clouds allowed to access the resources, and/or the processes allowed to access the resources, optionally at the user's direction or at specified time periods. The cloud application 202 can generate GUIs, e.g. dialog boxes, web pages, as required by the cloud application 202, to provide an interface for the user to modify the particular set of resources to make available to the cloud 102.

Then, in 520, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
receiving, by a processing device, from a user a request for access to resources, which are local to the user, in a pool of resources available for use in a cloud computing environment, wherein the resources are under control of the user, and are not included in the cloud computing environment, wherein the request comprises an amount of the resources and a process to be performed on the resources;
identifying a set of resources among the resources that are available to the cloud computing environment;
selecting, by the processing device, from the identified set of the resources a set of allowed resources for integrating with and for use by the cloud computing environment, wherein the set of allowed resources comprise the resources allowed to be accessed by the cloud computing environment;
providing access of the set of allowed resources to the cloud computing environment;
instantiating the process on the set of allowed resources; and
upon receipt of instructions from the user, modifying, by the processing device, the set of allowed resources to the cloud computing environment.

2. The method of claim 1, further comprising:
receiving a request from the cloud computing environment to allocate a portion of the set of allowed resources to the process in the cloud computing environment; and
allocating the portion of the allowed resources to the process.

3. The method of claim 1, wherein the allowed resources comprise one of a range of memory accessible by the cloud computing environment, a processor accessible by the cloud computing environment, or storage devices accessible by the cloud computing environment.

4. The method of claim 1, further comprising:
receiving the selection of the set of allowed resources accessible by the cloud computing environment; and
storing the selection of the set of allowed resources.

5. The method of claim 4, wherein the selection of the set of allowed resources comprises one of a first identification of cloud computing environments that can access the set of allowed resources or a second identification of cloud computing environment processes that can access the set of allowed resources.

6. The method of claim 1 wherein the request comprises a parameter defining operation of the resource.

7. The method of claim 1 wherein the parameter comprises one of a period for the process, a task for the process, a resource service level agreement for the process and amount of processing power to be available to each instance of the resource.

8. A system comprising:
a memory;
a processing device operatively coupled to a memory to:
receive from a user a request for access to resources, which are local to the user, in a pool of resources available for use in a cloud computing environment, wherein the resources are under control of the user, and are not included in the cloud computing environment, wherein the request comprises an amount of the resources and a process to be performed on the resources
identify a set of resources among the resources that are available to the cloud computing environment;
select from the identified set of the resources a set of allowed resources for integrating with and for use by the cloud computing environment, wherein the set of allowed resources comprise the resources allowed to be accessed by the cloud computing environment;
provide access of the set of allowed resources to the cloud computing environment;
instantiate the process on the set of allowed resources; and
upon receipt of instructions from the user, modify the set of allowed resources to the cloud computing environment.

9. The system of claim 8, wherein the processing device to:
receive a request from the cloud computing environment to allocate a portion of the set of allowed resources to the process in the cloud computing environment; and
allocate the portion of the allowed resources to the process.

10. The system of claim 8, wherein the allowed resources comprise one of a range of memory accessible by the cloud computing environment, a processor accessible by the cloud computing environment, or storage devices accessible by the cloud computing environment.

11. The system of claim 8, wherein the processing device is to:
receive the selection of the set of allowed resources accessible by the at cloud computing environment; and
store the selection of the set of allowed resources.

12. The system of claim 11, wherein the selection of the set of allowed resources comprises one of a first identification of the cloud computing environment that can access the set of allowed resources or a second identification of cloud processes of the cloud computing environment that can access the set of allowed resources.

13. The system of claim 8, wherein the user is associated with a cloud management system in the cloud computing environment.

14. The system of claim 8 wherein the request comprises a parameter defining operation of the resource.

15. The system of claim 8 wherein the parameter comprises one of a period for the process, a task for the process, a resource service level agreement for the process and amount of processing power to be available to each instance of the resource.

16. A non-transitory computer-readable storage medium storing computer-executable instructions that when executed by a processing device, cause the processing device to:
receive from a user a request for access to resources, which are local to the user, in a pool of resources available for use in a cloud computing environment, wherein the resources are under control of the user, and are not included in the cloud computing environment, wherein the request comprises an amount of the resources and a process to be performed on the resources;
identify a set of resources among the resources that are available to the cloud computing environment;
select from the identified set of the resources a set of allowed compute resources for integrating with and for use by the cloud computing environment, wherein the set of allowed resources comprise the resources allowed to be accessed by the cloud computing environment;
provide access of the set of allowed resources to the cloud computing environment;
instantiate the process on the set of allowed resources; and
upon receipt of instructions from the user, modify the set of allowed resources to the cloud computing environment.

17. The non-transitory computer-readable storage medium of claim 16, the processing device to:

receive a request from the cloud computing environment to allocate a portion of the set of allowed resources to the process in the cloud; and allocate the portion of the allowed resources to the process.

18. The non-transitory computer-readable storage medium of claim 16, wherein the allowed resources comprise one of a range of memory accessible by the cloud computing environment, a processor accessible by the cloud computing environment, or storage devices accessible by the cloud computing environment.

19. The non-transitory computer-readable storage medium of claim 16, the processing device to:

receive a selection of the set of allowed resources accessible by the cloud computing environment; and store the selection of the set of allowed resources.

20. The non-transitory computer-readable storage medium of claim 19, wherein the selection of the set of allowed resources comprises one of a first identification of cloud computing environments that can access the set of allowed resources or a second identification of cloud computing environment processes that can access the set of allowed resources.

21. The non-transitory computer-readable storage medium of claim 16 wherein the request comprises a parameter defining operation of the resource.

22. The non-transitory computer-readable storage medium of claim 16 wherein the parameter comprises one of a period for the process, a task for the process, a resource service level agreement for the process and amount of processing power to be available to each instance of the resource.

* * * * *